United States Patent [19]

Hellriegel

[11] 4,259,823
[45] Apr. 7, 1981

[54] ELASTIC SEALING AND MOUNTING STRIP

[75] Inventor: Edmund Hellriegel, Pulheim, Fed. Rep. of Germany

[73] Assignee: Ford Motor Company, Dearborn, Mich.

[21] Appl. No.: 28,942

[22] Filed: Apr. 11, 1979

[51] Int. Cl.³ .......................... E06B 3/62; E04F 15/14
[52] U.S. Cl. ...................................................... 52/400
[58] Field of Search ........................... 52/398, 399, 400

[56] References Cited

U.S. PATENT DOCUMENTS

| | | | |
|---|---|---|---|
| 2,556,775 | 6/1951 | Oswald | 52/400 |
| 2,828,535 | 3/1959 | Bush | 52/398 |
| 3,672,109 | 6/1972 | Erck | 52/400 |
| 3,728,832 | 4/1973 | Erck | 52/400 |
| 3,815,303 | 6/1974 | Ziegler | 52/400 |

FOREIGN PATENT DOCUMENTS

| | | | |
|---|---|---|---|
| 244045 | 12/1965 | Austria | 52/397 |
| 1025738 | 11/1967 | Fed. Rep. of Germany. | |

Primary Examiner—John E. Murtagh
Attorney, Agent, or Firm—John J. Roethel; Clifford L. Sadler

[57] ABSTRACT

An elastic sealing and mounting strip, especially for windows in motor vehicle bodywork. The strip has a main body portion with an arch that covers the gap between the window and the bodywork. A groove receives the edge of the window and a lip extends over the flange edge of a window opening. A number of sealing lips are supported against abutting parts of the bodywork and are supported by harder inserts or are sprung as a result of the presence of hollow chambers in the strip.

3 Claims, 2 Drawing Figures

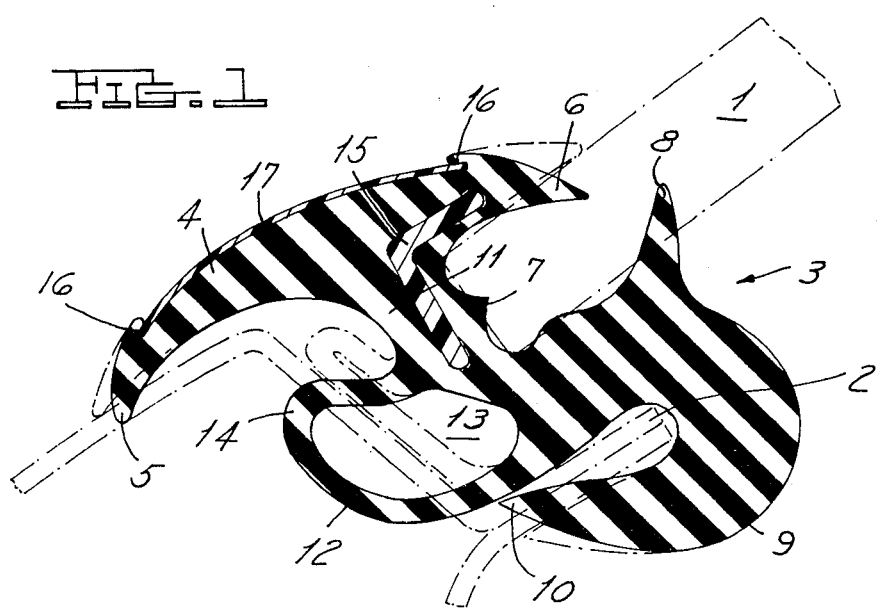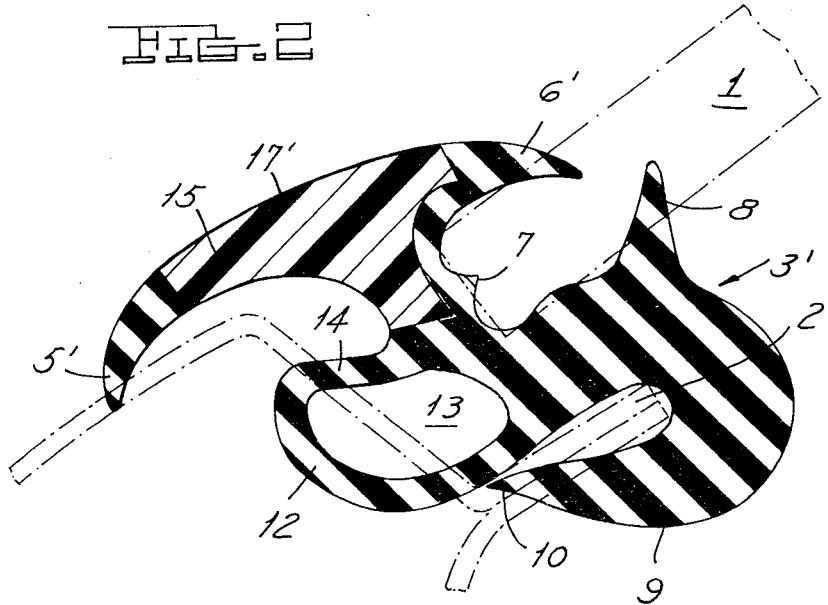

ELASTIC SEALING AND MOUNTING STRIP

BACKGROUND OF THE INVENTION

Elastic sealing and mounting strips for sealing and mounting windows in vehicle bodies have already been disclosed in a very large number of very diverse embodiments. The following publications may be mentioned as the prior art which forms the basis of delimitation of the present invention, the most essential of the characteristics, and the disadvantages from which they suffer, being pointed out.

German Auslegeschrift No. 1,025,738 discloses a sealing and mounting strip with a hollow chamber surrounding the groove which receives the edge of the window. This hollow chamber permits better adaptation of the groove to the shape of the rim of the window, but in no way improves the sealing action of the strip in relation to the bodywork.

German Auslegeschrift No. 1,254,034 shows a sealing and mounting strip with undercut edges, for receiving a decorative strip. The decorative strip is sealed against the bodywork by sealing lips.

German Auslegeschrift No. 1,914,350 discloses a sealing and mounting strip with a hollow chamber located below the base of the groove which receives the rim of the window. This hollow chamber, however, does not improve the sealing action of the strip towards the bodywork and an additional adhesive must be employed.

German Offenlegungsschrift No. 2,041,407 discloses a sealing and mounting strip with embedded harder inserts for stiffening certain parts of the sealing strip. Here again, the strip is sealed against the bodywork only by simple sealing lips.

Continuous experience in the mass production of motor vehicles shows, in spite of a great variety of embodiments of sealing and mounting strips employed over the years, that given the wide tolerances encountered in bodywork construction, a large number of leaks at the assembled window arrangements must always be expected. The sealing operations required to overcome these leaks, entailing injection of additional sealing compositions under the sealing lips, leads either to considerable increases in production costs as a result of the subsequently required cleaning operations, or detracts from the status of the manufacturing company if this sealing operation is only carried out by the Customer Service Department if a leak should occur.

It is, therefore, the object of this invention to improve a sealing and mounting strip in such a way that absolute leakproofness of the fitted window arrangement is achieved without the use of additional sealing compositions.

SUMMARY OF THE INVENTION

The invention starts from the prior art which has already been employed successfully for some time in a related field, namely, the sealing of movable bodywork parts. These are so-called tubular sealing strips, such as are disclosed, for example, in German Offenlegungsschrift 1,680,226. As a result of their pneumatic behavior under load due to the movable bodywork part, these tubular sealing strips provide good compensation for varying tolerances. However, they are unsuitable for sealing a fixedly fitted window arrangement, since, for this purpose, they would have to provide a supporting and holding function, for which they are not suitable.

The desired reliable sealing and supporting action is not achieved merely by combining the sealing and mounting strip, provided with a substantially conventional profile, with a tubular sealing lip which is known per se. Only as a result of the construction, according to this invention, of one wall of the hollow chamber forming the tubular sealing lip in the manner of a Z-shaped bend of greater thickness than the remaining wall, is the necessary supporting function for the window arrangement achieved simultaneously with the good sealing action.

DESCRIPTION OF THE DRAWINGS

The invention is explained in more detail in relation to two embodiments shown in the drawings. In these:

FIG. 1 shows an enlarged, vertical section through a sealing and mounting strip according to the invention, the solid lines corresponding to the non-fitted state and the dot-dash lines to the fitted state; and FIG. 2 shows a similar section to FIG. 1, through a further embodiment of a sealing and mounting strip.

In the Figures, a window 1 is located in a window opening, formed by a flange rim 2 of a motor vehicle body, and is sealed and held by a sealing and mounting strip 3.

The sealing and mounting strip 3 has a main body protion with an arch 4 that externally covers the gap between the window 1 and the bodywork, which arch rests on the one hand against an external surface of the bodywork via a first sealing lip 5, and on the other hand against an external surface of the window 1 via a sealing lip 6. The sealing and mounting strip 3 has an upwardly opening a receiving groove 7 corresponding to the thickness of the window 1. A sealing lip 8 rests against the inside of the window 1. The sealing and mounting strip 3 has outwardly extending a holding lip 9 overlapping the flange rim 2, which lip rests against the bodywork by a sealing lip 10.

The sealing and mounting strip 3 is provided, next to the bottom 11 of the receiving groove 7, with a hollow chamber 13 forming a tubular sealing lip 12, one wall of which, 14, is bent Z-shaped to form the extension of the receiving groove 7 and is thicker than the remaining wall of the tubular sealing lip 12.

The thicker wall 14, which is bent Z-shaped, is of such curvature and such thickness that when subjected to a certain load from the weight of the window 1 it is compressed to form a narrow Z-support and possibly a Z-block length. The thicker wall 14 which is bent Z-shaped thus provides the required supporting function, and as a result permits the remaining part of the tubular sealing lip 12 to exert the pneumatic sealing function.

The sealing and mounting strip 3 can be provided with an L-shaped support strip 15, of a harder material, which surrounds the front edge of the groove 7 which receives the window 1. This support strip 15 is, however, only required if certain high demands are made in respect of the resistance of the window arrangement to ejection.

The covering arch 4 of the sealing and mounting strip 3 is provided with undercut edges 16 which serve to hold a sheetmetal or foil decorative strip 17.

FIG. 2 shows a further embodiment of a sealing and mounting strip wherein the identical parts carry the identical reference numerals, while differing parts carry reference numerals provided with an apostrophe.

In the embodiment of the sealing and mounting strip 3 shown in FIG. 2, the original L-shaped support strip of harder material has been broadened to form a T-shaped profile strip 15', the back of which replaces the previous covering arch 4, and onto which a decorative foil strip 17' can be sealed directly. The ends of the T-shaped profile strip 15' are provided with appropriate molded-on sealing lips 5' and 6' of an elastic material.

The thicker wall, bent Z-shaped, of the tubular sealing lip not only exerts a supporting function in the lower region of the window, but also provides a defined fold line for the tubular sealing lip in the vertical and upper horizontal regions of the window seal.

I claim:

1. In combination, a motor vehicle bodywork having a window opening, a window panel and an elastic sealing and mounting strip for mounting the window panel in the opening, the strip having a main body portion or a predetermined hardness, the main body portion having an arch that covers a gap between the window and the vehicle bodywork, the arch being engageable on the one hand against an external surface of the bodywork via a first sealing lip and on the other hand against an external surface of the window via a second sealing lip, the main body portion having a receiving groove corresponding substantially to the thickness of the window, a sealing lip at one side of the groove engageable against the interior side of the window, the main body portion having a downwardly extending holding lip having overlapping engagement with a flange rim of the vehicle body work projecting into the window opening, the holding lip having a sealing lip engageable with the interior surface of the flange rim, the main body portion having contiguous to the bottom of the receiving groove, a hollow chamber forming a tubular sealing lip engaged with the bodywork forwardly externally of the rim flange, the hollow chamber having a Z-shaped wall portion in common with a bottom wall of the receiving groove and being thicker than the remaining hollow chamber wall.

2. In combination, according to claim 1, in which:

an L-shaped support strip embedded in the main body portion surrounds a portion of the bottom and exterior walls of the window receiving groove, the L-shaped support strip being substantially more rigid than the main body portion.

3. In combination, according to claim 1 or 2, the Z-shaped wall portion being compressible under load to form a narrow Z-support supporting the window, the hollow chamber being compressible to exert a pneumatic seal against the bodywork.

* * * * *